US012773814B2

(12) United States Patent
Lombardini

(10) Patent No.: US 12,773,814 B2
(45) Date of Patent: Oct. 27, 2026

(54) PLANT FOR THE PRODUCTION OF PLASTIC FILMS TO BE THEN SUBJECTED TO A STRETCHING PROCESS AND RELATED METHOD

(71) Applicant: COLINES S.P.A., Novara (IT)

(72) Inventor: Nicola Lombardini, Novara (IT)

(73) Assignee: COLINES S.P.A., Novara (IT)

(*) Notice: Subject to any disclaimer, the term of this patent is extended or adjusted under 35 U.S.C. 154(b) by 53 days.

(21) Appl. No.: 18/996,783

(22) PCT Filed: Jul. 26, 2023

(86) PCT No.: PCT/IB2023/057563
§ 371 (c)(1),
(2) Date: Jan. 17, 2025

(87) PCT Pub. No.: WO2024/023720
PCT Pub. Date: Feb. 1, 2024

(65) Prior Publication Data
US 2026/0034710 A1 Feb. 5, 2026

(30) Foreign Application Priority Data
Jul. 28, 2022 (IT) ........................ 102022000015984

(51) Int. Cl.
*B29C 43/46* (2006.01)
*B29C 43/24* (2006.01)
(Continued)

(52) U.S. Cl.
CPC .............. *B29C 43/46* (2013.01); *B29C 43/24* (2013.01); *B29C 48/0011* (2019.02);
(Continued)

(58) Field of Classification Search
CPC ..... B29C 43/24; B29C 43/46; B29C 48/0018; B29C 48/914; B29C 55/02; B29C 2043/462
See application file for complete search history.

(56) References Cited

U.S. PATENT DOCUMENTS

2003/0175539 A1 9/2003 Matsuzaka et al.
2004/0099973 A1* 5/2004 Liu .......................... B29D 7/01 264/2.7
(Continued)

FOREIGN PATENT DOCUMENTS

JP 4117589 B2 7/2008

OTHER PUBLICATIONS

International Search Report for PCT/IB2023/057563 dated Aug. 16, 2023 (3 pages).

*Primary Examiner* — Atul P. Khare
(74) *Attorney, Agent, or Firm* — Merchant & Gould P.C.

(57) ABSTRACT

A plant produces plastic films subjected to stretching. The plant includes a flat extrusion head made of polyethylene-based plastic material, first and second rollers forming a rolling press, and a third cooling/stabilizing roller. Molten plastic material/melt exiting the flat head passes through the first and second rollers before being directed onto the third cooling/stabilizing roller. The extrusion head has a width of 1,000-5,000 mm, the first and second rollers each have a diameter of 200-800 mm. The third roller has a diameter of 400-1,000 mm. The first and second rollers are made of ferrous material, with a conductive heat transfer coefficient of at least 15 W/(mK). The ferrous material is a construction steel with a chrome-plated and mirror-polished surface, having a roughness (Ra)<1 μm, copper coatings, or coatings having thermal-conductivity and surface-roughness values
(Continued)

corresponding to the rollers. The first and/or second roller has a deformable and non-stick coating.

8 Claims, 2 Drawing Sheets

(51) Int. Cl.

| | |
|---|---|
| ***B29C 48/00*** | (2019.01) |
| ***B29C 48/08*** | (2019.01) |
| ***B29C 48/88*** | (2019.01) |
| ***B29C 48/91*** | (2019.01) |
| *B29C 55/02* | (2006.01) |
| *B29K 105/00* | (2006.01) |
| *B29L 7/00* | (2006.01) |

(52) U.S. Cl.

CPC .......... *B29C 48/0018* (2019.02); *B29C 48/08* (2019.02); *B29C 48/91* (2019.02); *B29C 48/914* (2019.02); *B29C 2043/462* (2013.01); *B29C 55/02* (2013.01); *B29K 2023/06* (2013.01); *B29K 2105/256* (2013.01); *B29K 2905/10* (2013.01); *B29K 2995/0013* (2013.01); *B29K 2995/0073* (2013.01); *B29L 2007/008* (2013.01)

(56) References Cited

U.S. PATENT DOCUMENTS

| | | | | |
|---|---|---|---|---|
| 2005/0248051 | A1 | 11/2005 | Cancio et al. | |
| 2010/0078849 | A1* | 4/2010 | Noritsune .............. | B29D 11/00 264/175 |
| 2010/0103352 | A1* | 4/2010 | Suzuki ..................... | C08K 5/49 252/589 |
| 2022/0055283 | A1* | 2/2022 | Schuster ................. | B29C 43/24 |

* cited by examiner

PLANT FOR THE PRODUCTION OF PLASTIC FILMS TO BE THEN SUBJECTED TO A STRETCHING PROCESS AND RELATED METHOD

CROSS-REFERENCE TO RELATED APPLICATION

This application is a National Stage Application of PCT/IB2023/057563, filed on 26 Jul. 2023, which claims benefit of Serial No. 102022000015984 filed on 28 Jul. 2022 in Italy, and which applications are incorporated herein by reference. To the extent appropriate, a claim of priority is made to each of the above-disclosed applications.

FIELD OF INVENTION

The present invention relates to a plant for the production of plastic films to be then subjected to a stretching process, and to a related method.

BACKGROUND ART

Plastic films are currently made and used, which are subjected to a general stretching process after they are produced. Such a stretching process can take place either immediately downstream of film production or on a different, separate line.

In the first case, the stretching process typically takes place in a so-called "in-line" configuration, while in the second case, it takes place as a true subsequent process, performed on a different production line, in a typically so-called "off-line" configuration.

It is worth noting that the aforesaid stretching process can concern only one of the two main dimensions of the film (i.e., width and length, since the very considerable difference with respect to the third dimension—thickness—can prefigure such a product as two-dimensional for all intents and purposes), or both directions, at later times rather than simultaneously.

Hereafter in this document, stretching in the machine direction, i.e., along the length of the film, will be identified as "MDO," and stretching in the transversal direction, i.e., across the width of the film, as "TDO".

The production of relatively thin plastic film (hereafter referred to as "film") suitable for flexible packaging, whether domestic or industrial, has been growing almost steadily for several decades, and product quality is also constantly evolving and specializing along with the quantity demand.

In particular, in recent years, various national governments have become generally aware of the need to promote and ensure the widest recycling of plastics, with the dual purpose of reducing the amount of plastics in hand and thus reducing the emission of $CO_2$ into the environment.

A key aspect for ensuring an effective virtuous circular economy is the recyclability of flexible packaging, which is not always as obvious as it might seem at first glance.

Indeed, there are various types of flexible packaging obtained by joining different films, each characterized by very specific properties (chemical, physical, or even just aesthetic). However, such properties are not always perfectly compatible with one another, and therefore they require special processes (usually referred to as "lamination"), which are now very well established and efficient, to join them.

In these cases, the real problem arises in the subsequent operation of recycling such products consisting of a plurality of variously coupled films. Indeed, it is not always—if ever—possible to separate the different films forming the packaging after the use of the product thus composed in order to recycle them. It is worth noting that it would be optimal to separate them from one another so that they can be recycled with maximum efficiency, but this implies the use of expensive processes that have definitely non-negligible yields and energy consumptions (and thus, indirectly, $CO_2$ emissions).

Referring to the specific field of flexible packaging, it is precisely in this perspective that the so-called "stretching" process of plastic films, i.e., the increase of the length (or width) of the film at the expense of the thickness thereof, is gaining increasing importance. This is done by means of special MDO (machine-direction orientation) and TDO (transversal-direction orientation) operating units, which consist of a series of rollers traveling at different, typically incremental, speeds.

The concept of machine-direction orientation (MDO) is especially gaining more and more favor because of its lower complexity compared to combined TDO or MDO+TDO solutions. This choice is also made because the physical-mechanical features that can be achieved with the film by means of this process are already more than sufficient for most of the needs of the flexible packaging industry.

More specifically, we are witnessing an epochal change in the paradigm linked to printed polyethylene-based flexible packaging, which has always been the predominant part of the entire market (about 60% of the total).

Indeed, the current situation is related to a combination of different types of materials being capable of meeting different market demands, namely:

- a film typically (but not exclusively) made of BOPET, or biaxially-oriented polyester, which has excellent printability and processability features in converting operations;
- a printing process carried out on said BOPET film;
- a film typically (but not exclusively) made of polyethylene, produced either by cast or blown technology, characterized by excellent sealability properties, even in applications with the presence of oils or lubricants in general;
- a lamination process in which the printed layer of BOPET film is "bonded" with the non-sealing layer of PE film, so that the final "package" is thus composed:

$$BOPET/\mathrm{print}/\mathrm{lamination}/PE$$

This final product covers the vast majority of market needs but it has a flaw that is becoming increasingly limiting: it is a perfect example of what have been previously declared, i.e., it is difficult to recycle.

The individual materials (PET, PE) are easily recoverable when taken individually, but once coupled, the separation process is highly expensive and not particularly efficient.

For such reasons, the market is calling for the possibility of using a PE-based film as an alternative to BOPET, but obviously characterized by the peculiarities that a film suitable for the application must have (i.e., temperature resistance to promote the sealing of the inner PE film and sufficient stiffness to maintain the print pitch).

The final product would thus be configured as a "mono-material", which definition is conventionally given to all products made of at least 95% materials from the same family (and in the present case, that of polyethylenes).

Indeed, the presence of substrates, such as the print and the "glue" of the lamination process, is always well below 5% of the total: therefore, a condition like that mentioned would fall squarely within the mono-material sector.

The only way to give a PE-based film the above-mentioned physical-mechanical features is precisely by means of a machine-directed MD stretching process because the stiffness of the product can be greatly increased. Indeed, the elastic limit of the film is abundantly exceeded, permanently deforming it in its plastic phase while increasing the thermal resistance features thereof.

Obviously, the type of resin used must also be adequate and in particular, it is substantially (though not exclusively) necessary to use a large relative amount of so-called high-density polyethylene, or HDPE (High-Density Poly-Ethylene).

Such a material has the peculiarity of being highly sensitive to the cooling process to which it is subjected as soon as it is extruded, i.e., depending on the speed at which it is taken from the liquid state (typical of the extruder) to the solid state, it can be more or less "prone" to MD stretching in the machine direction.

Indeed, the stretching operation is performed by heating the film beforehand so as to drastically lower the value of the flexural modulus thereof, but at a temperature significantly lower than the Vicat temperature, i.e., the film must still have a consistency such as to absorb the stretching process through the orientation of its molecular chains.

It is precisely such a process that characterizes the film from a mechanical and physical point of view, i.e., the plastic film needs to be effectively "yielded" while it is still in a solid or at least semi-solid state.

Without delving into details related to the chemistry of the product, it is worth noting that for some types of polymers—certainly including HDPE—a particularly slow melt cooling process must be implemented so that the film thus produced can be effectively prepared for the subsequent stretching operation.

A slow cooling process can be "almost" performed on extrusion lines characterized by blown technology because the melt exiting from the head is cooled by means of an air blow uniformly circumferentially distributed about the "bubble" and thermoregulated. The convective heat transfer coefficient of air, although moving, is naturally significantly poor when compared with other heat transfer systems; therefore, such a technology could be considered as winning.

However, the extrusion process with blown technology necessarily involves the upward movement of the so-called "bubble", i.e., the film subjected to air cooling.

It results that the cooling process cannot be excessively slow either, because at least an outer "skin" strong enough to support the weight of the tube itself must be created.

Unfortunately, for reasons essentially related to the final application, it is precisely the materials used for the skin layers that are the most sensitive to cooling, such as HDPE, because they are the ones that must ensure the maximum thermal resistance of the product during the operation of sealing the inner polyethylene film.

As for the cast technology, the presence of a thermoregulated roller on which the melt is cast would prefigure the possibility of managing the cooling of the melt at will.

However, some limitations must be taken into account even in this case:

- the temperature of said casting roller should still be lower than the Vicat temperature of the material, otherwise, it would not be possible to "extract" it from the roller at the end of its passage: in other words, it is necessary to arrive at the end of the first cooling roller with a melt strength high enough to allow the film to be drawn without causing any elastic or plastic deformation;
- moreover, a typical feature of cast production technology is the presence of a given amount of air (air "gap") between the melt and the first cooling roller, caused by the air transport generated by the roller itself. Therefore, in order to have a cooling process as even as possible, which affects the evenness of the film morphology, such an air "gap" must be carefully managed, attempting to minimize it so that the melt takes on the same temperature as the roller;
- there are several solutions, such as the presence of a so-called "vacuum box" positioned behind the extrusion head, which can suck in and thus evacuate said air, or of the so-called "pressure air-blades" positioned instead frontally on the roller itself and having the purpose of "pushing" the melt against the roller to prevent the entrapment of said air;
- however, all current solutions have some rather obvious limitations in that they do not allow the amount of air present between film and roller to be completely eliminated or managed highly precisely. In brief, it is not possible to adequately control the movement of the melt on the surface of the casting roller because it "floats" above the aforesaid air "gap", resulting in the production of a film that is totally uneven in terms of thickness but above all of morphology (i.e., degree of crystallinity).

The proof that the current state of the art (especially with reference to the production of polyethylene-based MD-oriented films) is far from having reached an acceptable condition is that there are very few manufacturers of such a type of films in the world and that the levels of waste required to succeed in producing it are immeasurably higher than that for producing an unstretched film.

Moreover, the few manufacturers on the market all use the blown technology in any case, which, from a certain point of view, as mentioned above, is more "ready" to process these kind of products.

SUMMARY OF THE INVENTION

It is the general object of the present invention to make a plant and method which can solve the aforesaid drawbacks of the prior art in a highly simple, cost-effective, and particularly functional manner.

It is another object of the present invention to make a production method of the so-called "primary" film, i.e., entering in the MDO unit, which can brilliantly overcome the limitations of the prior art mentioned above.

In particular, the suggested method must start from the assumption that with blown technology it is not possible to improve the current situation, which has apparently reached its limits arising from the same technological concept.

It is another object of the present invention to make a plant and method for the production of plastic films to be then subjected to a stretching process capable of overcoming the drawbacks of the prior art set forth above.

The aforesaid objects are achieved by a plant for the production of plastic films to be then subjected to a stretching process and by a related method carried out according to the following independent claims and sub-claims.

The structural and functional features of the present invention and the advantages thereof over the prior art will become even more apparent from a discussion of the following description, also referring to the accompanying diagrammatic drawings, which show an embodiment of the invention itself.

DETAILED DESCRIPTION OF THE INVENTION

Figure 1:
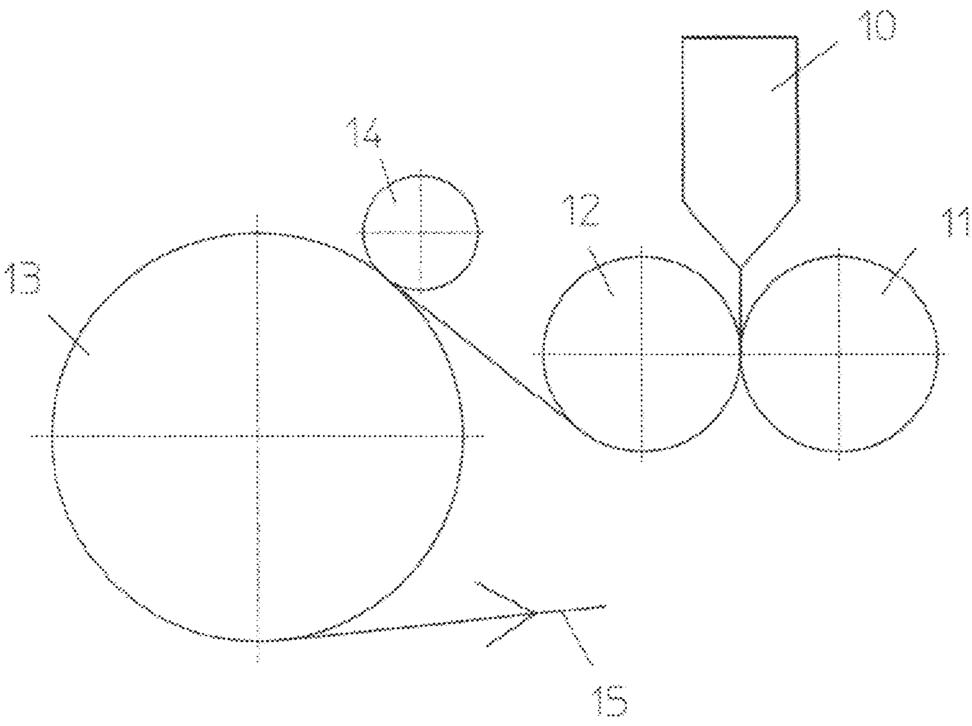
FIG. 1 diagrammatically shows a first generalized embodiment of a plant according to the invention for the production of plastic films to be then subjected to a stretching process which is also capable of implementing the method of the invention.

In the following description, in order to illustrate the figures, the same reference numerals are used to indicate constructional elements with the same function. Moreover, for clarity of illustration, some reference numerals cannot have been repeated in all figures.

Indications such as "vertical" and "horizontal," "upper" and "lower" (in the absence of other indications) must be read with reference to the assembly (or operating) conditions and referring to the normal terminology in use in current jargon, where "vertical" indicates a direction substantially parallel to that of the gravity force vector "g" and horizontal indicates a direction perpendicular thereto.

With reference to the figures, which are illustrative and non-limiting, various embodiments of a plant for the production of plastic films to be then subjected to a stretching process according to the invention are shown.

The concept underlying the suggested plant is that the presence of a small or large amount of air between the melt and the casting roller is the real limitation inherent in cast technology, i.e., it will never be possible to have sufficient control over the melt cooling process if such a random condition is relied upon.

It is worth emphasizing that such a limitation arises if the film thus produced must be then subjected to a stretching operation, where any morphological differences in the product are emphasized, effectively making the final film unusable.

Needless to say, for the production of films that do not need to be subjected to subsequent stretching operations, on the other hand, the quality ensured by the current casting process is absolutely adequate for the market needs.

The solution suggested by the present invention is as simple as it is effective; indeed, it aims at performing a sort of "rolling" of molten plastic material (melt), i.e., implementing the passage through a "nip" created between two facing and cooperating rollers, so as to avoid air entrapment between the molten plastic material or melt and the rollers themselves.

It is thus possible to effectively manage the heat transfer between the elements involved with given values not affected by an amount of air that would otherwise be very difficult to measure. Obviously, the dimensional and geometric features of such rollers must be well defined so as to ensure the possibility of adequately handling a molten plastic material that must be maintained in a "non-solid" state for as long as possible.

In particular, with reference to FIG. 1, in the first embodiment of the plant, a series of elements, which are indicated below, is provided and arranged in sequence.

Firstly, there is a flat extrusion head 10, the width dimension of which can vary preferably but not exclusively between about 1000 mm up to about 5000 mm.

A first rolling press roller 11 then follows, the diameter of which can vary preferably but not exclusively from about 200 mm up to about 800 mm.

The first rolling press roller 11 cooperates with a second rolling press roller 12, the diameter of which can vary preferably but not exclusively from about 200 mm up to about 800 mm. Such an arrangement creates a passage through a "nip" obtained between the two facing and cooperating rollers, which advantageously allows avoiding the entrapment of air between the molten plastic material or melt exiting the flat extrusion head 10 and the rolling press rollers 11 and 12 themselves which will form a film 15.

In the embodiment shown in FIG. 1, the presence of a cooling/stabilizing roller 13 in the sequence is noticed, the diameter of which can vary preferably but not exclusively from about 400 mm up to about 1000 mm, and on which the film formed between the two rolling press rollers 11 and 12 is wound. It is worth noting that a pressure roller 14 is also present in this sequence, which cooperates in the ingress and arrangement of the film 15 exiting from the two rollers 11 and 12 onto the third cooling/stabilizing roller 13.

According to the invention, special attention must be paid to the construction and surface finish, especially of the rolling press rollers 11 and 12, which are the ones that give the film its optical and flatness qualities.

Since the maximum heat transfer must be ensured in order to accurately manage the cooling process, the rolling press roller 12 should preferably (but not exclusively) be made of ferrous material, which has an indicative conductive heat transfer coefficient of at least 15 W/(mK).

Typical examples can be structural steels with chrome-plated and mirror-polished surfaces, or with intrinsically highly low roughness (Ra<1 μm), copper fillers, or others.

Even more important and delicate is the configuration of the rolling press roller 11, which should fulfill multiple purposes, such as:

- ensuring the correct temperature control of the film face in contact therewith,
- ensuring an even contact meniscus between the two rollers, which is fundamental to having an even film thickness,
- having non-stick properties to avoid the melt from sticking to the surface thereof,
- having surface finish features adapted to not "score" or damage the film, i.e., ensuring proper surface flatness.

All these features could be met using a rolling press roller 11 with similar features to those of the rolling press roller 12 (i.e., characterized by a construction of ferrous material and a chrome-plated, mirror-polished surface, for example) if the thickness of the film to be produced were significant (preferably but not exclusively over 500 μm) so that it could be rightly considered as a "slab".

Regretfully, however, the reference thicknesses of films suitable for the applications mentioned above (such as BOPET film replacement) are about 20-30 μm after stretching; while considering a stretching ratio of up to about 6:1, which for the products of interest herein is practically the upper limit, it means producing a pre-MDO film of about 180-200 μm at most.

Indeed, as mentioned earlier, a thickness considered as acceptable by the market for a MOPE film that could advantageously replace (i.e., with similar mechanical features such as not compromising the final result of the complete package) the current BOPET film should have a thickness of at least 20-30 μm; considering that the maximum stretch ratio to which, according to current technological and chemical knowledge, polyethylene-based films can be subjected is not more than 6:1, it results that the maximum reference thickness for the primary film should be about 30×6=180 microns, possibly even less since the general trend is to minimize the thickness of such a type of film.

For this kind of thickness, the concept of rolling between two rigid rollers becomes difficult to apply, due to the dimensional tolerances of the rollers dangerously becoming of the same order of magnitude as the film to be produced. Indeed, with the rolling between two rigid rollers, the contact meniscus is substantially reduced to a line, therefore the ensured thickness uniformity is provided by the presence of the so-called "buildup" of molten material above such a joining line.

Clearly, the thinner the film to be produced, the more delicate the balance of such a situation, and the unevenness of the film that must be then subjected to a stretching process is unfortunately amplified by the process itself, resulting in a nonconformity of the final product.

A solution suggested by this invention is to use a rolling press roller 11 with a coating of deformable, non-stick material, which can thus greatly increase the contact area (or meniscus) between the two rolling press rollers and thus "compensate" for any unevenness in the buildup.

This is all because the present invention aims at applying such a concept in the production of a film that must then be subjected to a stretching process (preferably but not exclusively MD). Incidentally, the stretching process can take place either immediately downstream of the rolling press unit (typical "in-line" configuration) or even on a different production plant at a later time (typical "off-line" configuration).

The coating of such a rolling press roller 11 can thus be of various kinds, such as:

- a coating of silicone rubber, suitable for working at high temperatures and especially having a remarkable elastic recovery even under hot working conditions,
- a coating of composite materials, containing silicon or other minerals, for example, which raise the operating temperature thereof without compromising the low hardness and high elastic recovery properties thereof,
- an outer Teflon sleeve, with a thickness typically but not exclusively varying between 0.5 mm and 5 mm, which ensures thermal resistance and non-stick properties suitable for the process.

Typical hardness values for a solution like that suggested can range from 50 Sh up to 80 Sh, although there is still the possibility of using significantly lower or higher hardnesses as well (said range is simply shown as the most suitable for the application). The mechanical characterization of the production plant can obviously take different embodiments from those shown in FIG. 1, since it is possible to provide embodiments that in some ways follow similar arrangements to those of current rolling presses.

Figure 2:
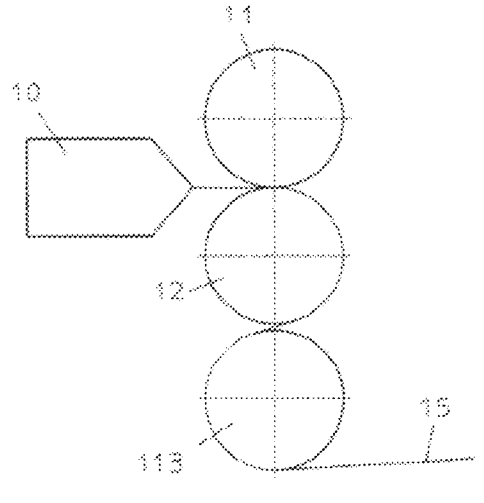
FIGS. 2 and 3 show summary diagrams of second embodiments of a plant according to the invention.
Figure 3:
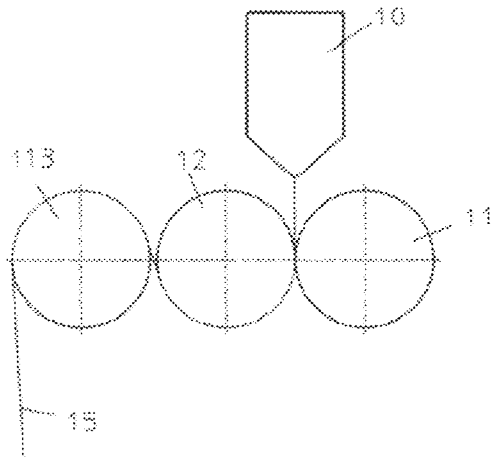

For example, FIGS. 2 and 3 briefly show second embodiments of a plant according to the invention.

FIG. 2 shows a rolling press arrangement comprising three rolling press rollers 11, 12, 113, the last rolling press roller 113 also having a cooling/stabilizing function. The three rollers 11, 12, 113 are arranged along a common vertical axis, one on top of the other.

FIG. 3 shows a rolling press arrangement also comprising three rolling press rollers 11, 12, 113, the last rolling press roller 113 also having a cooling/stabilizing function with horizontal flat extrusion head 10. The three rollers 11, 12, 113 are arranged according to a common horizontal axis, placed side by side with a vertical flat extrusion head 10.

Figure 4:
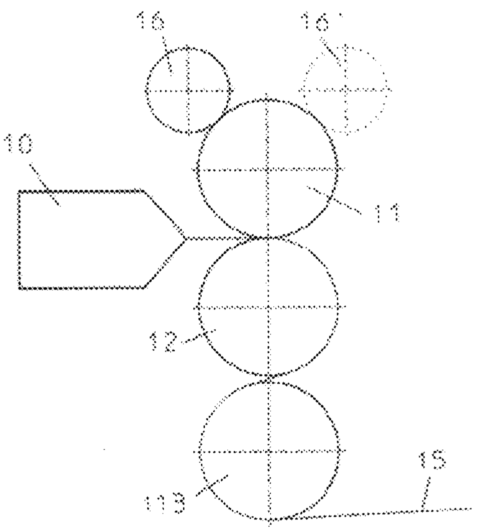
FIGS. 4 and 5 show summary diagrams of third embodiments of a plant according to the invention.

FIG. 4 shows a rolling arrangement similar in all respects to that in FIG. 2, in which one or two cooling counter-pressure rollers 16, 16' directly operating on the first roller 11 are further located.

Figure 5:
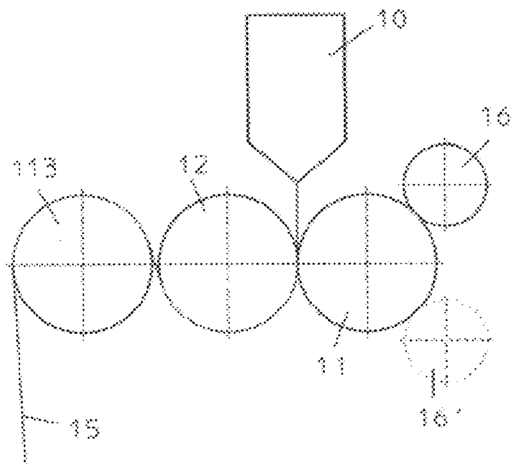

FIG. 5 shows a rolling arrangement similar in all respects to that in FIG. 3, in which one or two cooling counter-pressure rollers 16, 16' directly operating on the first roller 11 are also further located.

The cooling counter-pressure rollers 16, 16' can also have a construction typically (but not exclusively) of a ferrous nature and with chrome-plated and polished surfaces that ensure proper heat removal from the roller 11 by means of direct contact therewith.

Figure 6:
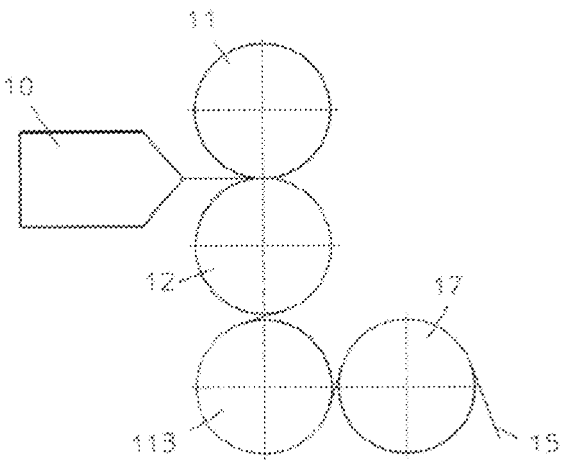
FIGS. 6 and 7 show summary diagrams of fourth embodiments of a plant according to the invention.
Figure 7:
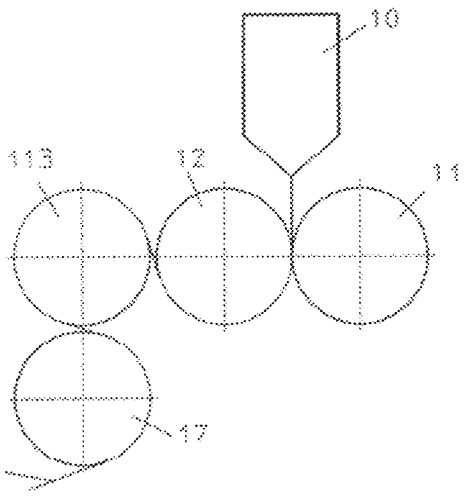

FIGS. 6 and 7 compared with FIGS. 4 and 5 involve the placement of an additional roller 17 to make a four-roller rolling press assembly 11, 12, 113, and 17 which develops the advantages of the present invention.

Likewise, it is possible to use the pressure roller 14 shown in FIG. 1 or not, depending on the final configuration of the production line.

The object mentioned in the preamble of the description is thus achieved.

The scope of protection of the present invention is defined by the appended claims.

The invention claimed is:

1. A plant for production of plastic film subjectable to a stretching process, said plant comprising in succession:

a flat extrusion head for the extrusion of polyethylene-based molten plastic material or melt, at least a first roller and a second roller, arranged to form a rolling press, and at least a third cooling/stabilizing roller, wherein the molten plastic material or melt exiting from the flat head is passed through said at least first roller and second roller facing each other and collaborating with each other before being directed onto said third cooling/stabilizing roller, wherein said flat extrusion head has a width dimension ranging from at least 1,000 mm up to 5,000 mm, said first roller of said rolling press has a diameter ranging from at least 200 mm to 800 mm, said second roller of said rolling press has a diameter ranging from at least 200 mm up to 800 mm, and said at least a third cooling/stabilizing roller has a diameter ranging from at least 400 mm up to 1,000 mm, wherein said at least first roller and second roller are made of ferrous material with a conductive heat transfer coefficient of at least 15 W/(mK), said ferrous material being a construction steel with a chrome-plated and mirror-polished surface, having a roughness (Ra)<1 μm, copper coatings, or coatings having a conductive heat transfer coefficient of at least 15 W/(mK) and surface-roughness of (Ra)<1 μm, and wherein at least one of said first roller and second roller comprises a coating of deformable and non-stick material.

2. The plant according to claim 1, comprising a pressure roller arranged downstream of said at least first roller and second roller, before said at least one third cooling/stabilizing roller, in contact with said cooling/stabilizing roller.

3. The plant according to claim 1, comprising one or two counter-pressure rollers configured for cooling and directly operating on said first roller.

4. The plant according to claim 1 wherein said coating of deformable and non-stick material comprises a coating of a silicon rubber.

5. The plant according to claim 1 wherein said coating of deformable and non-stick material comprises a coating of composite materials containing silicon.

6. The plant according to claim 1 wherein said coating of deformable and non-stick material comprises a polytetrafluoroethylene sleeve with a thickness ranging from 0.5 mm to 5 mm.

7. The plant according to claim 1 wherein said coating of deformable and non-stick material has a hardness value ranging from 50 Sh up to 80 Sh.

8. A method for production of plastic film subjectable to a stretching process, said method being implemented in a plant that comprises in succession:

a flat extrusion head for the extrusion of polyethylene-based molten plastic material or melt, at least a first roller and a second roller, arranged to form a rolling press, and at least a third cooling/stabilizing roller, wherein said at least first roller and second roller are facing each other and collaborate with each other, wherein said flat extrusion head has a width dimension ranging from at least 1,000 mm up to 5,000 mm, said first roller of said rolling press has a diameter ranging from at least 200 mm to 800 mm, said second roller of said rolling press has a diameter ranging from at least 200 mm up to 800 mm, and said at least third cooling/stabilizing roller has a diameter ranging from at least 400 mm up to 1,000 mm, wherein said at least first roller and second roller are made of ferrous material with a conductive heat transfer coefficient of at least 15 W/(mK), said ferrous material being a construction steel with a chrome-plated and mirror-polished surface, having a roughness (Ra)<1 μm, copper coatings, or coatings having a conductive heat transfer coefficient of at least 15 W/(mK) and surface-roughness values of (Ra)<1 μm, and wherein at least one of said first roller and second roller comprises a coating of deformable and non-stick material;

said method comprising:

extruding at least 95% polyethylene-based plastic material from the flat extrusion head to form the molten plastic material or melt exiting from the flat head; and passing said molten plastic material or melt exiting from the flat head into said at least first roller and second roller facing each other and collaborating with each other before being directed onto the at least a third cooling/stabilizing roller.

* * * * *